(12) United States Patent
Goto

(10) Patent No.: US 7,576,914 B2
(45) Date of Patent: Aug. 18, 2009

(54) LIGHT-DIFFUSING SHEET

(75) Inventor: Masahiro Goto, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 314 days.

(21) Appl. No.: 10/565,242

(22) PCT Filed: Nov. 22, 2004

(86) PCT No.: PCT/JP2004/017343

§ 371 (c)(1),
(2), (4) Date: Jan. 19, 2006

(87) PCT Pub. No.: WO2005/052657

PCT Pub. Date: Jun. 9, 2005

(65) Prior Publication Data

US 2006/0176562 A1    Aug. 10, 2006

(30) Foreign Application Priority Data

Nov. 28, 2003 (JP) ............................. 2003-399327

(51) Int. Cl.
*G02B 5/02* (2006.01)
(52) U.S. Cl. .................. 359/599; 359/613; 362/355; 349/112
(58) Field of Classification Search ............... None
See application file for complete search history.

(56) References Cited

U.S. PATENT DOCUMENTS 6,049,649 A * 4/2000 Arai ........................... 385/133
6,995,907 B2 * 2/2006 Osawa et al. ................. 359/460

FOREIGN PATENT DOCUMENTS

| JP | A 07-230002 | 8/1995 |
|----|-------------|--------|
| JP | A 08-335044 | 12/1996 |
| JP | A 10-319216 | 12/1998 |
| JP | A 2003-050307 | 2/2003 |
| JP | A 2003-057416 | 2/2003 |
| JP | A 2003-504691 | 2/2003 |
| JP | A 2003-066206 | 3/2003 |
| WO | WO 01/04701 A | 1/2001 |

* cited by examiner

*Primary Examiner*—Arnel C Lavarias
(74) *Attorney, Agent, or Firm*—Oliff & Berridge, PLC

(57) ABSTRACT

A light-diffusing sheet having a flat entrance surface and an exit surface parallel to the entrance surface, the light-diffusing sheet includes a sheet body, and a plurality of wedge-shaped parts, each being embedded on the side of the exit surface of the sheet body and expanding toward the exit surface. The wedge-shaped parts have a refractive index lower than that of the sheet body. Each of side surfaces of each of the wedge-shaped parts is formed of inclined surfaces constituting a polygonal surface. Angles formed by the inclined surfaces of each side surface and the perpendicular to the exit surface gradually become greater toward the exit surface. An end of each of the wedge-shaped parts on the side of the entrance surface is flat surface parallel to the entrance surface.

8 Claims, 10 Drawing Sheets

LIGHT-DIFFUSING SHEET

TECHNICAL FIELD OF THE INVENTION

The present invention relates to a light-diffusing sheet for a liquid crystal display (LCD), a projection screen, or the like.

BACKGROUND ART

There are LCDs and projection screens provided with a light-diffusing sheet to enable viewers to view images from angles in a wide angular range.

As an example of the Light-diffusing sheet, a lenticular sheet having a surface provided with semicylindrical lenticules arranged parallel on a plane, and a sheet formed of resins respectively having different refractive indices are disclosed in, for example, JP 2003-504691 A (Patent document 1). In some cases, this lenticular sheet and this sheet are used in combination.

When the lenticular sheet having unflat surface is attached to the surface of the screen of an LCD with an adhesive, inequalities of the surface of the lenticular sheet are filled up with the adhesive. In most cases, the respective refractive indices of the material forming the lenticular sheet and the adhesive do not differ greatly from each other. Consequently, the light diffusing effect on the basis of the inequality of the surface of the lenticular sheet is nullified.

A resin having a high refractive index and a resin having a low refractive index are expensive. When it is desired to form a light-diffusing sheet capable of diffusing incident light in a wide angular range, at least one of materials forming the light-diffusing sheet is inevitably an expensive resin and, consequently, the manufacturing cost of the light-diffusing sheet is high.

SUMMARY OF THE INVENTION

The present invention has been made in view of those problems and it is therefore an object of the present invention to provide a light-diffusing sheet formed of resins respectively having refractive indices not greatly differing from each other and having a large viewing angle.

A light-diffusing sheet according to the present invention having a flat entrance surface and an exit surface parallel to the flat entrance surface includes: a sheet body; and a plurality of wedge-shaped parts, each being embedded on the side of the exit surface of the sheet body, having a section of a shape substantially resembling a wedge, expanding toward the exit surface, and being formed of a resin having a refractive index lower than that of a material of the sheet body; wherein each of the side surfaces of each of the wedge-shaped parts is formed of inclined surfaces constituting a polygonal surface, angles formed by the inclined surfaces of each side surface and the perpendicular to the entrance surface gradually become greater toward the exit surface, and an end of each of the wedge-shaped parts on the side of the entrance surface is flat surface parallel to the entrance surface.

In the light-diffusing sheet according to the present invention, the angle formed by the inclined surface, nearest to the exit surface, of the side surface of the wedge-shaped part and the perpendicular to the entrance surface is not smaller than twice the angle formed by the inclined surface, nearest to the entrance surface, of the side surface of the wedge-shaped part and the perpendicular to the entrance surface.

In the light-diffusing sheet according to the present invention, each of the wedge-shaped parts of the light-diffusing sheet is adjusted such that the ratio of light rays reflected in total reflection by the exit surface to all of the light rays incident on the entrance surface at incident angles in the range of 0° to 30° is in the range of 0.1% to 3%.

In the light-diffusing sheet according to the present invention, the ratio of the refractive index of the wedge-shaped parts to that of the sheet body is in the range of 0.90 to 0.97.

In the light-diffusing sheet according to the present invention, each of the wedge-shaped parts of the light-diffusing sheet is adjusted such that the ratio of light rays reflected in total reflection at least twice on the side surfaces of the wedge-shaped parts to all of the light rays perpendicularly incident on the entrance surface is 1% or above.

The light-diffusing sheet according to the present invention further includes an auxiliary diffusing layer formed on the side of the exit surface of the sheet body.

In the light-diffusing sheet according to the present invention, the wedge-shaped parts are arranged at a fixed pitch P, and the flat end surfaces of the wedge-shaped parts have a width W in the range of 0.1 P to 0.2 P.

In the light-diffusing sheet according to the present invention, light-absorbing particles are dispersed in the wedge-shaped parts.

According to the present invention, light incident on the entrance surface of the light-diffusing sheet can be diffused in a wide angular range and emerges from the exit surface even if the respective refractive indices of the sheet body and the wedge-shaped parts do not differ greatly from each other by adjusting the respective widths of the inclined surfaces of the side surfaces of the wedge-shaped parts embedded in the sheet body and the respective inclinations of the inclined surfaces of the side surfaces of the wedge-shaped parts embedded in the sheet body to the perpendicular to the entrance surface. Each of the wedge-shaped parts of the light-diffusing sheet can be adjusted so that the intensity of the outgoing light emerging from the exit surface can be made to change smoothly in the angular range of diffusion.

Light fallen at angles to the entrance surface can be diffused by adjusting the width of the flat end surfaces relative to the pitch of the wedge-shaped parts.

DESCRIPTION OF THE PREFERRED EMBODIMENTS

An embodiment of the present invention will be described below with reference to the accompanying drawings.

Figure 1:
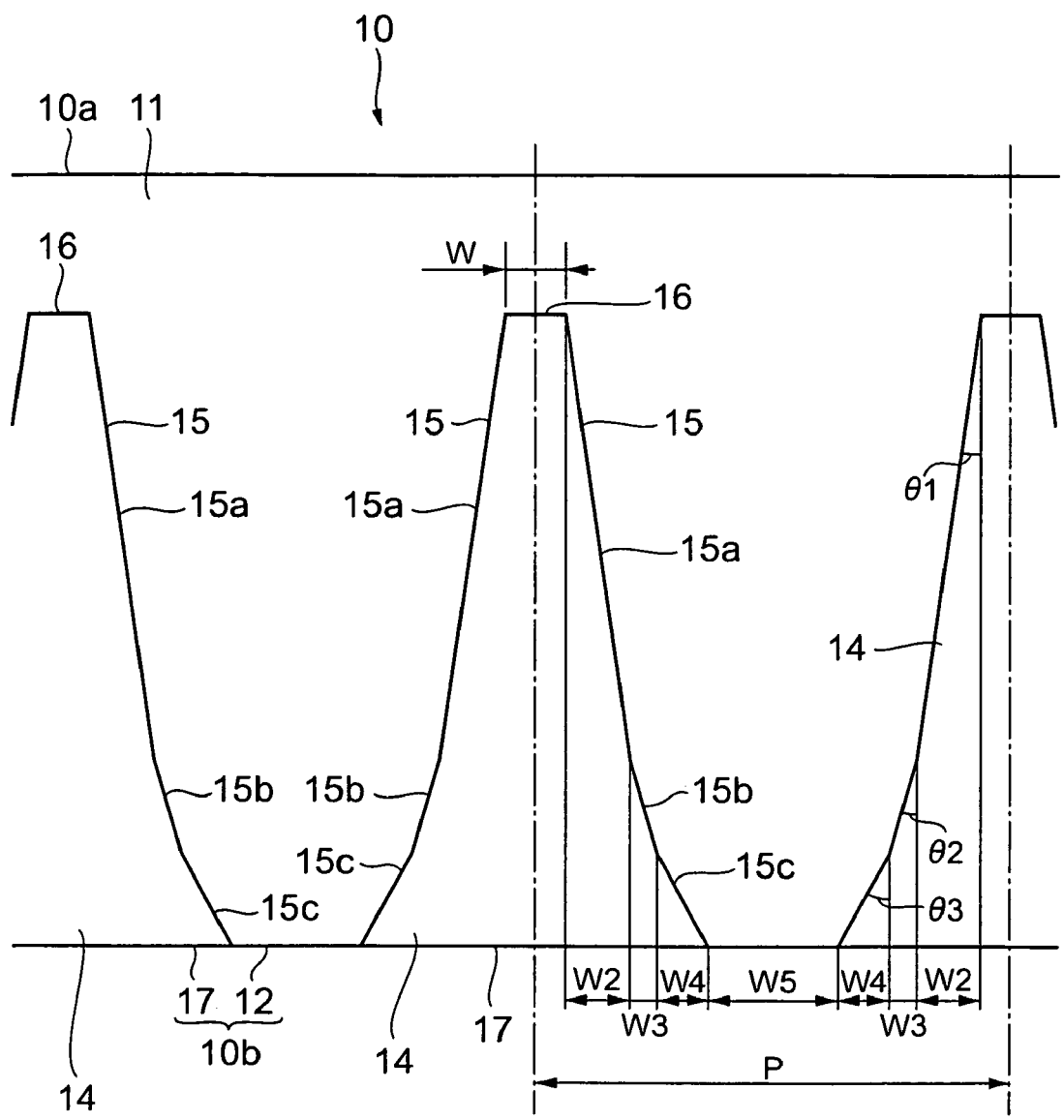
FIG. 1 is a sectional view of an embodiment of a light-diffusing sheet according to the present invention.
Figure 8:
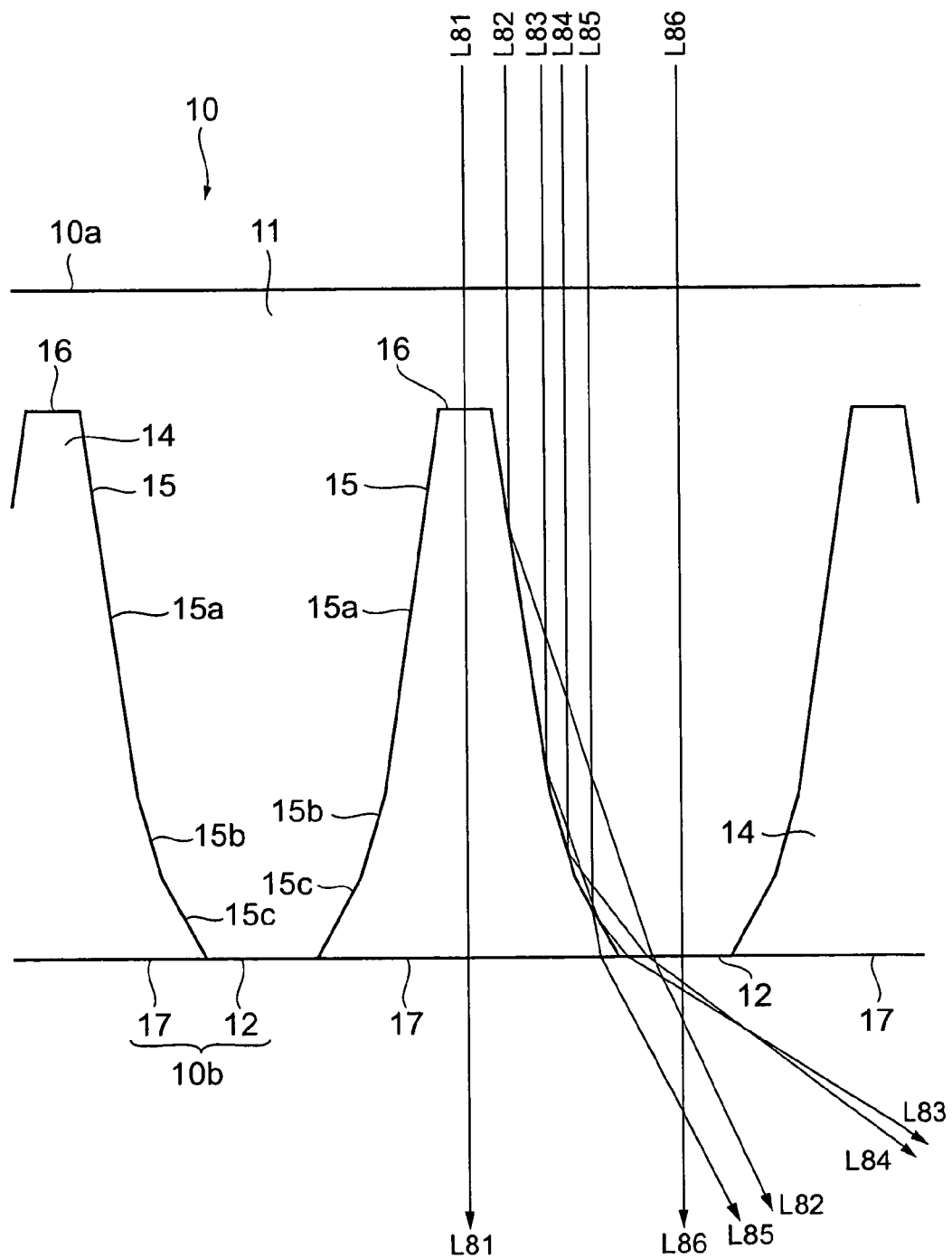
FIG. 8 is a diagram showing optical paths of light rays perpendicularly incident on the entrance surface of the light-diffusing sheet shown in FIG. 1.
Figure 9:
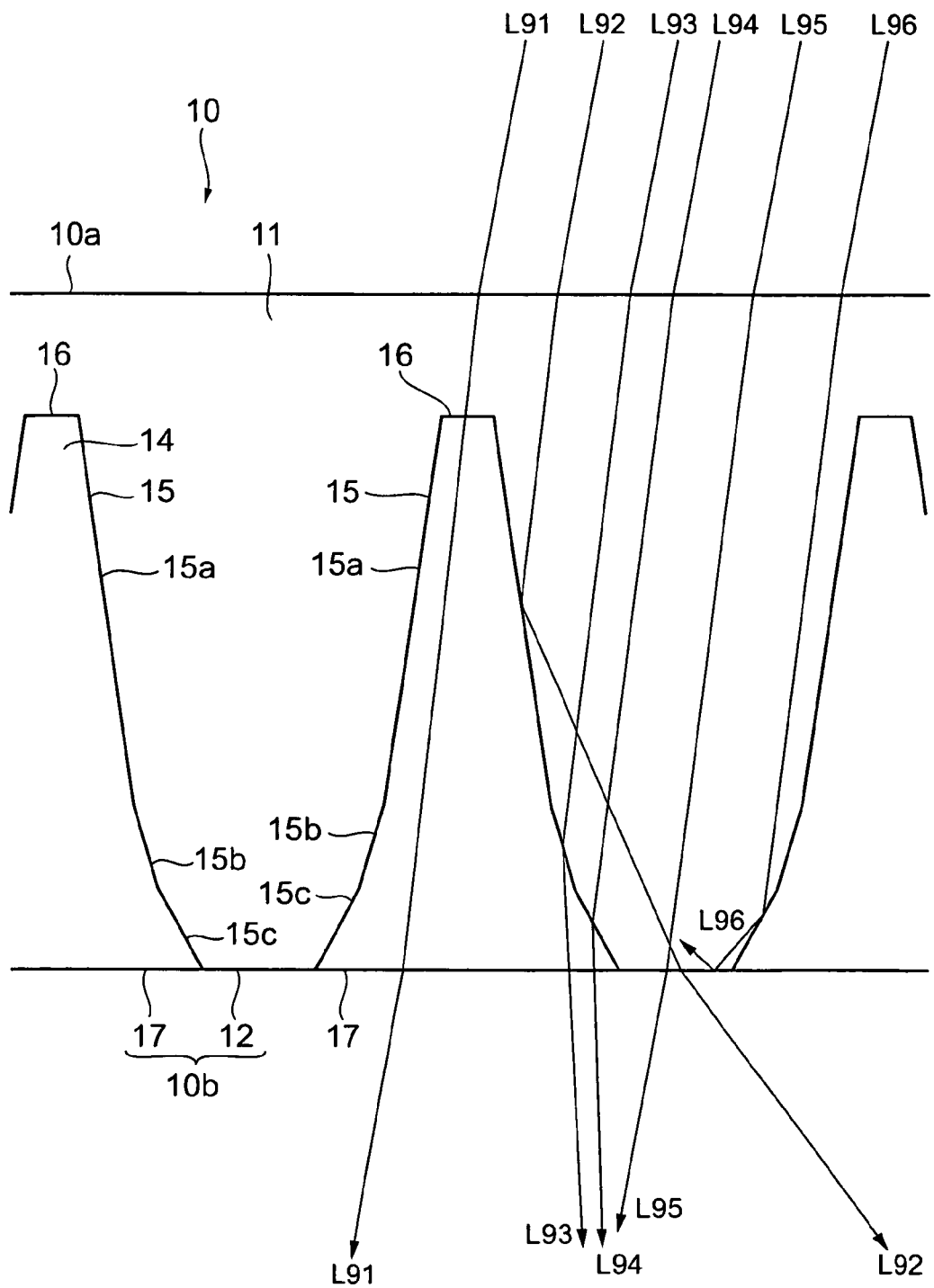
FIG. 9 is a diagram showing optical paths of light rays incident on the entrance surface of the light-diffusing sheet shown in FIG. 1 at an incident angle of 10°.
Figure 10:
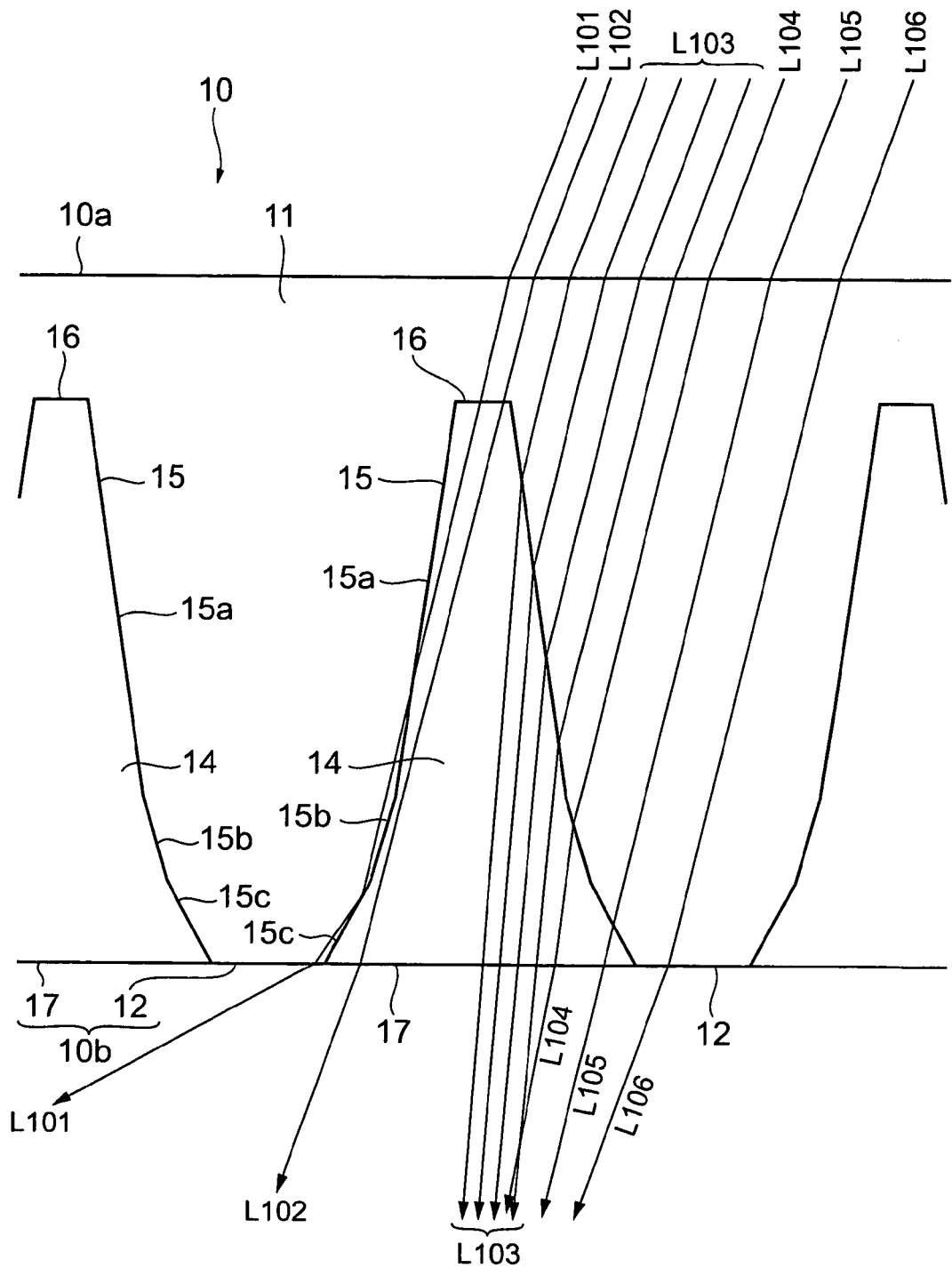
FIG. 10 is a diagram showing optical paths of light rays incident on the entrance surface of the light-diffusing sheet shown in FIG. 1 at an incident angle of 20°.

FIG. 1 is a sectional view of a light-diffusing sheet 10 in the embodiment, FIG. 8 is a diagram showing optical paths of light rays perpendicularly incident on the entrance surface of the light-diffusing sheet 10 shown in FIG. 1, FIG. 9 is a diagram showing optical paths of light rays incident on the entrance surface of the light-diffusing sheet 10 shown in FIG. 1 at an incident angle (an angle of light ray incident on the entrance surface relative to the perpendicular to the entrance surface) of 10°, and FIG. 10 is a diagram showing optical paths of light rays incident on the entrance surface of the light-diffusing sheet 10 shown in FIG. 1 at an incident angle of 20°.

The light-diffusing sheet 10 has a flat entrance surface 10a facing to an LCD, a projector for a projection screen or the like, and an exit surface 10b parallel to the entrance surface 10a. The light-diffusing sheet 10 reflects and refracts image light rays projected thereon by an LCD, a projector for a projection screen or the like, to diffuse the incident light rays in wide angular range so that the diffused light rays leave (emerge from) the exit surface 10b in wide angular range. Consequently, the viewer is able to view an image displayed on the LCD or the projection screen satisfactorily from viewing directions in a wide viewing angle.

Firstly, light rays emitted by the LCD or the projection screen and fallen on the light-diffusing sheet 10 will be described. The LCD emits light rays in directions at angles in the range of about 0° to 30° to the perpendicular to the exit surface of the LCD. Most of the light rays are emitted in a direction substantially perpendicular to the exit surface of the LCD. Light rays fall on the entrance surface 10a of the light-diffusing sheet 10 at incident angles in the range of 0° to 30° when the light-diffusing sheet 10 is used in combination with the LCD. Most of the incident light rays fall substantially perpendicularly on the entrance surface 10a. In general, light rays projected by a projector for a projection screen are deflected by a Fresnel lens or the like to substantially perpendicularly fall on the entrance surface 10a of the light-diffusing sheet 10. Therefore, light rays fall substantially perpendicularly on the entrance surface 10a of the light-diffusing sheet 10 when the light-diffusing sheet 10 is used in combination with the projection screen.

The light-diffusing sheet 10 will be described. Referring to FIG. 1, the light-diffusing sheet 10 has a sheet body 11, and wedge-shaped parts 14, each being embedded in an exit surface side of the sheet body 11 and having a substantially wedge-shaped section expanding (diverging) toward the exit surface 10b.

The sheet body 11 is formed of a transparent resin, such as an acrylic resin. The sheet body 11 forms flat entrance surface 10a of the light-diffusing sheet 10. As describe later, the sheet body 11 also forms the flat exit surface 10b of the light-diffusing sheet 10 with outer end surfaces, on the side of the exit surface 10b, of the wedge-shaped parts 14.

The wedge-shaped parts 14 will be described. The wedge-shaped parts 14 are formed of a transparent resin, such as a UV-curable resin. The refractive index N2 of the wedge-shaped parts 14 is nearly equal to the refractive index N1 of the sheet body 11. The ratio N2/N1 is in the range of 0.90 to 0.97. Resins respectively having high refractive indices and those having low refractive indices are expensive. The sheet body 11 and the wedge-shaped parts 14 can be formed of comparatively inexpensive resins having medium refractive indices (preferably, in the range of 1.40 to 1.58), provided that the ratio N2/N1 is in the range of 0.90 to 0.97.

The wedge-shaped parts 14 extend in the direction of a height of the light-diffusing sheet 10 (a direction into the paper as viewed in FIG. 1) and are arranged at a fixed pitch P in a direction along the width of the light-diffusing sheet 10 (a transverse direction as viewed in FIG. 1). Each wedge-shaped part 14 is embedded in the sheet body 11, on the side of exit surface 10b. In this embodiment, the exit surface 10b of the light-diffusing sheet 10 is formed of the bottom surfaces (outer end surfaces) 17, on the side of the exit surface 10b, of the wedge-shaped parts 14 and end surfaces 12, on the side of the exit surface 10b, of sheet body 11. The exit surface 10b, similarly to the entrance surface 10a, is flat.

As shown in FIG. 1, each wedge-shaped part 14 has side surfaces 15 diverging toward the exit surface 10b, and a flat end surface 16 positioned at an end on the side of the entrance surface 10a. Flat end surface 16 is parallel to the entrance surface 10a. The section of the wedge-shaped part 14 has a shape substantially resembling a wedge converging toward the entrance surface 10a (converging upward as viewed in FIG. 1). In this embodiment, the section of the wedge-shaped part 14 is symmetrical as viewed in FIG. 1.

Each of the side surfaces 15 of the wedge-shaped part 14 is formed of inclined surfaces 15a, 15b and 15c to constitute a polygonal surface. In this embodiment, the side surface 15 consists of the three inclined surfaces 15a, 15b and 15c. The angles θ1, θ2 and θ3 formed by the inclined surfaces 15a, 15b and 15c and the perpendicular to the entrance surface 10a gradually become greater toward the exit surface 10 b.

The angle θ1 of the inclined surface 15a, nearest to the entrance surface, relative to the perpendicular to the entrance surface 10a is determined so that the inclined surface 15a can reflect light rays perpendicularly fallen on the entrance surface 10a in total reflection; that is, the angle θ1 meets a condition expressed by:

$$\sin(90°-\theta 1) > N2/N1$$

When the angles of the inclination of the side surface 15 are not greatly different from each other, light rays can be deflected at greater diffusion angles (i.e., angles of inclination of outgoing light rays emerging from the exit surface 10b relative to the perpendicular to the exit surface 10b) by reflection than by refraction (see, a reflected outgoing light ray L84 and a refracted outgoing light ray L85 shown in FIG. 8).

Figure 2:
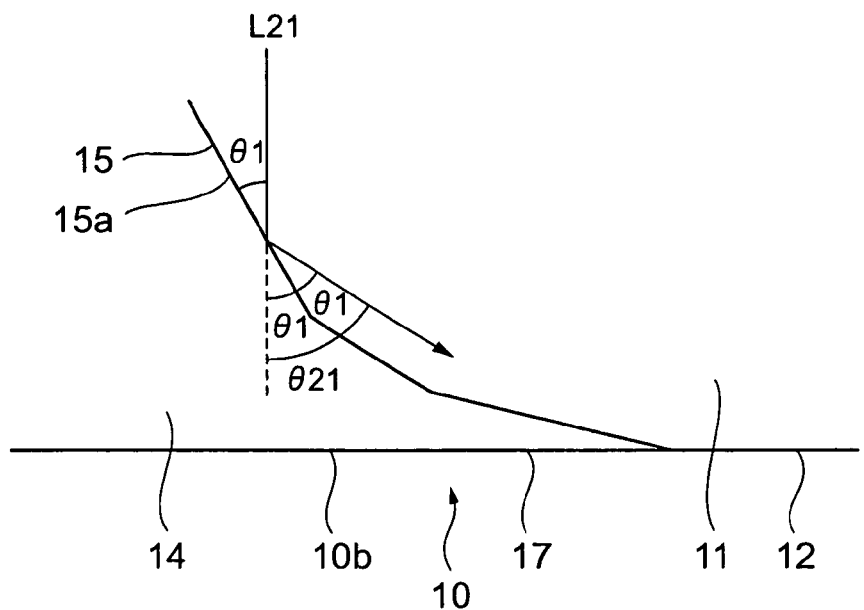
FIG. 2 is a diagram showing an optical path along which a light ray perpendicularly incident on the entrance surface of the light-diffusing sheet travels.

The angle between the inclined surface 15a nearest to the entrance surface 10a and the perpendicular to the entrance surface 10a must be very small to reflect light rays obliquely falling on the entrance surface 10a in total reflection. On the other hand, as shown in FIG. 2, an incident light ray L21, being perpendicularly fallen on the entrance surface 10a and reflected in total reflection on the inclined surface 15a nearest to the entrance surface 10a, is directed in a direction at an angle θ21, which is twice the angle θ1 formed by the inclined surface 15a and the perpendicular to the entrance surface 10a, relative to the perpendicular to the entrance surface 10a. Consequently, incident light rays perpendicularly fallen on the entrance surface 10a, which occupy the largest light quantity of all of the incident light rays when the light-diffusing sheet 10 is used in combination with an LCD or a projection sheet, cannot be deflected at large diffusion angles, if the angle θ1 between the inclined surface 15a and the perpendicular to the entrance surface 15a is small. Therefore, the angle θ1 between the inclined surface 15a nearest to the entrance surface 10a and the perpendicular to the entrance surface 10a is determined such that the angle θ1 is not excessively small under the condition in which the inclined surface 15a can reflect light rays perpendicularly fallen on the entrance surface 10 in total reflection.

As mentioned above, in the light-diffusing sheet 10 in this embodiment the ratio of the refractive index N2 of the wedge-shaped parts 14 to the refractive index N1 of the sheet body 11, namely, N2/N1, is in the range of 0.90 to 0.97. Consequently, the angle θ1 between the facet 15a nearest to the entrance surface 10a and the perpendicular to the entrance surface 10a cannot be large and the maximum diffusion angle is on the order of 50°.

Since the light-diffusing sheet 10 is subject to the foregoing restrictive conditions, it is desirable that the light ray reflected on the inclined surface 15a nearest to the entrance surface 10a in total reflection is reflected again on or refracted at the side surface 15 to increase the diffusion angle. Therefore, the side surface 15 of the wedge-shaped part 14 is formed as a polygonal surface consisting of the inclined surfaces 15a, 15b and 15c. The inclined surfaces 15a, 15b and 15c are arranged in that order toward the exit surface 10b, and the angles q1, q2 and q3 between each of the inclined surfaces 15a, 15b and 15c and the perpendicular to the entrance surface 10a increase in that order. In this case, as mentioned above, an incident light ray, which is perpendicularly fallen on the entrance surface 10a and reflected in total reflection on the inclined surface 15a nearest to the entrance surface 10a, is directed in a direction at an angle q21, which is twice the angle q1 formed by the inclined surface 15a and the perpendicular to the entrance surface 10a, relative to the perpendicular to the entrance surface 10a. Therefore, an inclined surface of the side surface 15 capable of refracting or reflecting the light ray reflected in the direction at the angle q21 to the perpendicular to the entrance surface 10a needs to be inclined to the perpendicular to the entrance surface 10a at an angle greater than the angle q21, which is twice the angle q1. Therefore, it is preferable that the angle q3 at which the inclined surface 15c nearest to the exit surface 10b is inclined relative to the perpendicular to the entrance surface 10a is not less than twice, more desirably, greater than twice, the angle q1 at which the inclined surface 15a nearest to the entrance surface 10a is inclined relative to the perpendicular to the entrance surface 10a, in order to make the light ray perpendicularly fallen on the entrance surface 10a and reflected in total reflection by the inclined surface 15a fall again on the side surface 15.

As mentioned above, reflection is able to increase the diffusion angle, at which the outgoing light ray is inclined relative to the perpendicular to the exit surface 10b, more effectively than refraction. Therefore, in order to increase the diffusion angle, it is desirable to adjust the respective widths W2, W3 and W4 of the inclined surfaces 15a, 15b and 15c of side surface 15 and the respective angles θ1, θ2 and θ3 of inclination of the inclined surfaces 15a, 15b and 15c relative to the perpendicular to the entrance surface 10a such that light rays are reflected at least twice in total reflection on the side surface 15. Experiments showed that 1/10 diffusion angle (namely, an angle of a viewing direction, the luminance in which is 1/10 of the peak luminance of outgoing light rays, relative to the perpendicular to the exit surface 10b) was in the range of 25° to 40° when 0% of incident light rays perpendicularly fallen on the entrance surface 10a were reflected in total reflection at least twice, while 1/10 diffusion angle was 70° when 3% of incident light rays perpendicularly fallen on the entrance surface 10a were reflected in total reflection at least twice. It was found through experiments made for different percentages of light rays reflected in total reflection at least twice that it is preferable to adjust the respective widths W2, W3 and W4 of the inclined surfaces 15a, 15b and 15c of the side surface 15 and the respective angles θ1, θ2 and θ3 of inclination of the inclined surfaces 15a, 15b and 15c relative to the perpendicular to the entrance surface 10a such that the percentage of light rays reflected in total reflection at least twice is 1% or above. When the construction of the light-diffusing sheet 10 was adjusted as mentioned above, the images could be viewed obliquely without color shading, reductions of contrast, or the like that make the viewers feel something is wrong.

Figure 3:
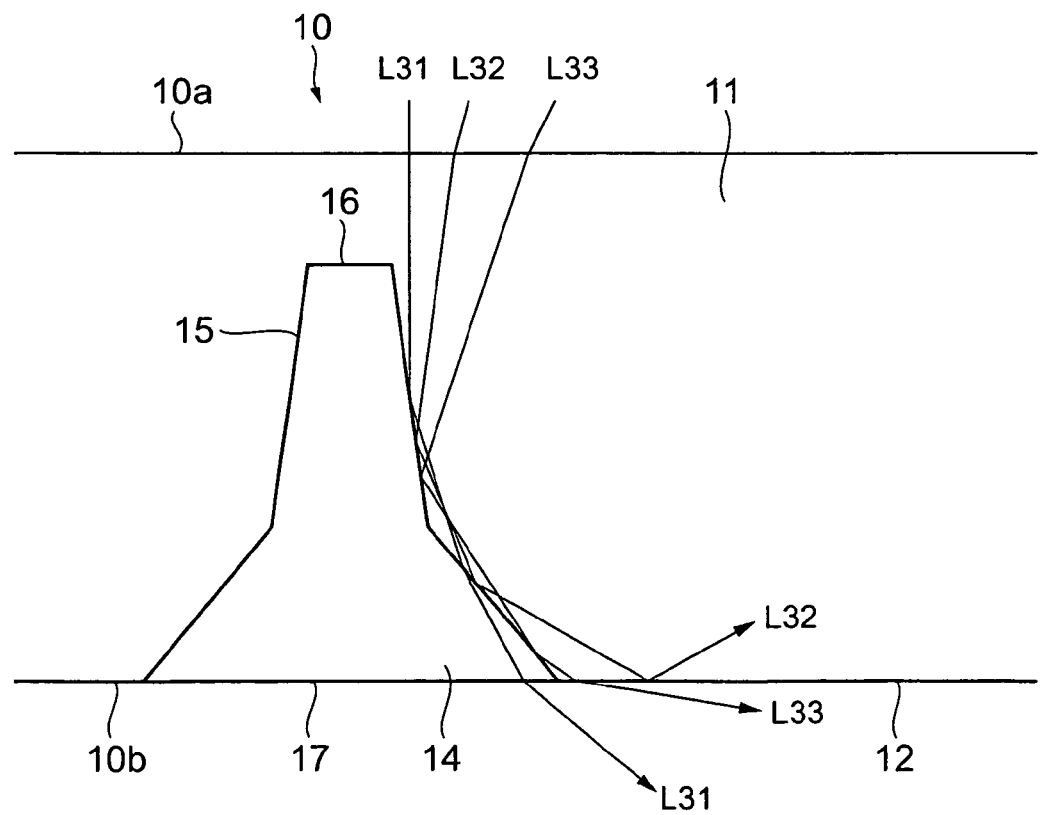
FIG. 3 is a diagram showing optical paths along which light rays incident on the light-diffusing sheet travel.

When the diffusion angles of outgoing light rays are thus increased, a light ray L33 is reflected so that the diffusion angle thereof is about 90°, while another light ray L32 is reflected in total reflection by the exit surface 10b as shown in FIG. 3. The light ray L32 reflected in total reflection by the exit surface 10b is a stray light ray that travels toward the entrance surface 10a. Such stray light rays reduce the contrast of images viewed by viewers and deteriorates the quality of images.

The diffusion angles can be changed to adjust the quantity of light rays which are reflected in total reflection by the exit surface 10b by adjusting the respective widths W2, W3 and W4 of the inclined surfaces 15a, 15b and 15c of side surface 15 of the wedge-shaped part 14 and the respective angles θ1, θ2 and θ3 of inclination of the inclined surfaces 15a, 15b and 15c relative to the perpendicular to the entrance surface 10a. When the construction of the wedge-shaped parts 14 of the light-diffusing sheet 10 was adjusted such that the ratio of light rays which are reflected in total reflection by the exit surface 10b relative to all of light rays fallen on the entrance surface 10a at incident angles in the range of 0° to 30° was 0%, the color tone of images viewed from viewing directions at angles not smaller than 80° relative to perpendicular to the exit surface 10b was entirely different from that of images viewed from a direction perpendicular to the exit surface 10b, and the contrast of the images viewed from viewing directions at angles not smaller than 80° relative to perpendicular to the exit surface 10b was very low. When the construction of the wedge-shaped parts 14 of the light-diffusing sheet 10 was adjusted such that 5% of the incident light rays were reflected in total reflection by the exit surface 10b, the general contrast of images was lowered and luminance decreased considerably due to the reduction of light utilization efficiency. On the other hand, when the construction of the wedge-shaped parts 14 of the light-diffusing sheet 10 was adjusted such that the 0.5% of incident light rays were reflected in total reflection by the exit surface 10b, difference in color tone between images viewed from viewing directions at angles not smaller than 80° relative to the perpendicular to the exit surface 10b and images viewed from a direction perpendicular to the exit surface 10b, and the general reduction of the contrast of the images viewed from viewing directions at angles not smaller than 80° relative to the perpendicular to the exit surface 10b did not make the viewers feel something is wrong. The reduction of general contrast and luminance was insignificant. It was found through experiments made for different quantities of light rays reflected in total reflection that it is preferable to adjust each of the wedge-shaped parts 14 of the light-diffusing sheet 10 such that the ratio of light rays reflected in total reflection by the exit surface 10b to all of incident light rays fallen at incident angles in the range of 0° to 30° on the entrance surface 10a is in the range of 0.1% to 3%.

Figure 4:
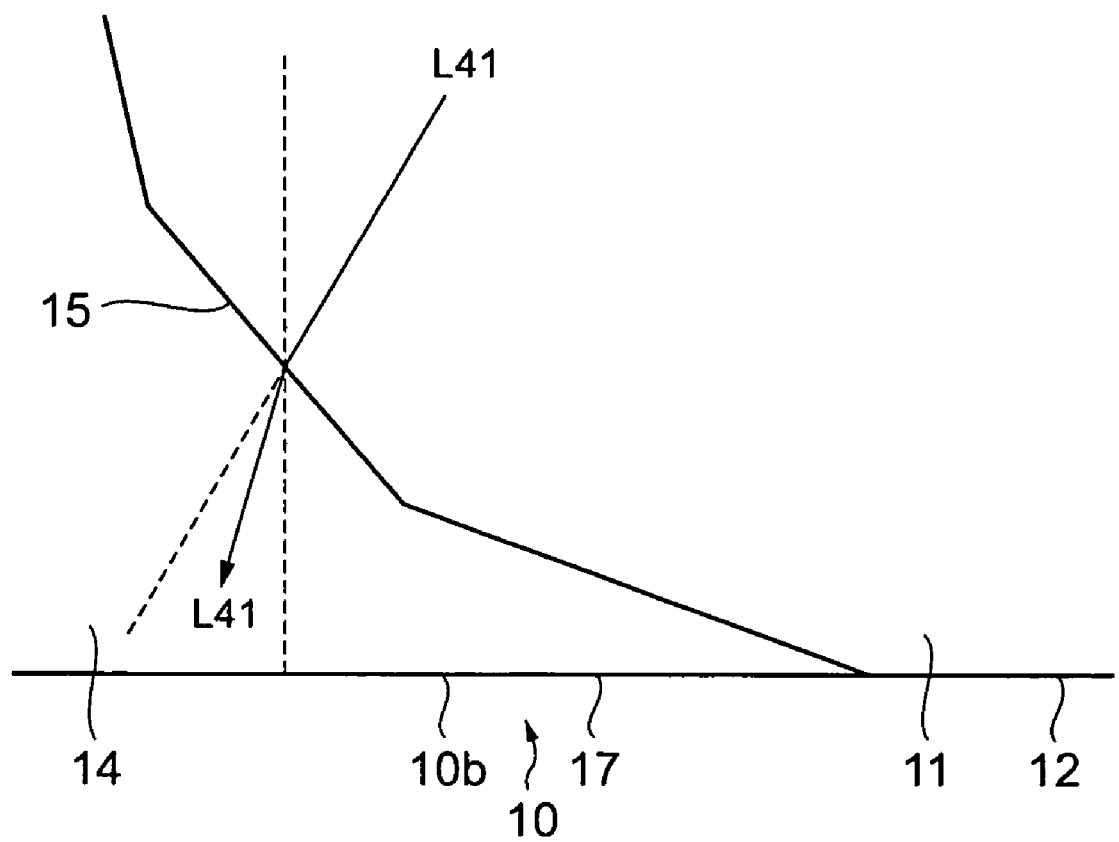
FIG. 4 is a diagram showing an optical path along which a light ray refracted at a side surface of a wedge-shaped part of the light-diffusing sheet.

Light rays which are refracted at the side surface 15 of the wedge-shaped part 14 will be described. When the side surface 15 is formed so that incident light perpendicularly fallen on the entrance surface 10a, the light quantity of which is the largest when the light-diffusing sheet 10 is used in combination with an LCD or a projection screen, are reflected several times or refracted, some of light rays incident on the entrance surface 10a at angles relative to the perpendicular to the entrance surface 10a (such as light rays L93 and L94 in FIG. 9 and light rays L103, L104 and L105 in FIG. 10) and light rays fallen on a inclined surface, inclined at a large angle relative to the perpendicular to the entrance surface 10a, of the side surface 15 (such as a light ray L85 in FIG. 8) fall on the side surface 15 of the wedge-shaped part 14 at angles not greater than critical angle of total reflection and are refracted at the side surface 15. An incident light ray L41 sloping down in a direction opposite a direction in which the side surface 15 is sloping down with respect to the perpendicular to the entrance surface 10a is refracted at the side surface 15 and has a tendency to be condensed in a direction substantially perpendicular to the entrance surface 10a as shown in FIG. 4. As shown in FIGS. 9 and 10, The greater the angle of an incident light rays relative to the perpendicular to the entrance surface 10a and the smaller the angle of inclination of the side surface 15 relative to the perpendicular to the entrance surface 10a, the more remarkable is this tendency. As shown in FIG. 8, light rays perpendicularly fallen on the entrance surface 10a among light rays fallen on the side surface 15 of the wedge-shaped part 14 are reflected on or refracted at the side surface 15 and emerge from the exit surface 10b at large diffusion angles. On the other hand, as shown in FIGS. 9 and 10, most of light rays obliquely fallen on the entrance surface 10a at some incident angles have a tendency to be condensed in a direction substantially perpendicular to the exit surface 10b by the side surface 15.

The flat end surface 16 of the wedge-shaped part 14 will be described. An incident light ray L81, which falls perpendicularly on the entrance surface 10a and falls on the flat end surface 16, emerges from the outer end surface 17, which forms a part of the exit surface 10a, of the wedge-shaped part 14 without being deflected. Since the difference between the refractive index N1 of the sheet body 11 and the refractive index N2 of the wedge-shaped part 14 are not large, the angles of inclination of a light ray L91 shown in FIG. 9 and light rays L101 and L102 shown in FIG. 10, which travel from the sheet body 11 into the wedge-shaped part 14 and are refracted at the flat end surface 16, relative to the entrance surface 10a do not change greatly before and after passing through the flat end surface 17. Therefore, as shown in FIG. 9, a light ray L91 incident on the entrance surface 10a at a small incident angle among light rays obliquely falling on the entrance surface 10a emerges from the light-diffusing sheet 10 through the outer end surface 17 of the wedge-shaped part 14; that is, the light ray L91 is not diffused and emerges from the exit surface 10b at angle relative to the perpendicular to the exit surface 10b equal to the incident angle. On the other hand, since the difference between the refractive index N1 of the sheet body 11 and the refractive index N2 of the wedge-shaped part 14 are not large, the angle θ1 between the inclined surface 15a nearest to the entrance surface 10a of the side surface 15 and the perpendicular to the entrance surface 10a cannot be large. Therefore, light rays fallen at large incident angles on the entrance surface 10a, namely, light rays inclined at angles greater than the angle of inclination of the side surface 15, travel into the sheet body 11 again through the side surface 15 of the wedge-shaped part 14, and then those light rays are reflected or refracted. Consequently, those light rays, such as a light ray L101, emerge from the exit surface 10b at large diffusion angles.

The end surface 12 of the sheet body 11 will be described. In this embodiment, the end surface 12 is a part of the exit surface 10b of the light-diffusing sheet 10. Light rays L86, L95 and L106, falling at incident angles on the entrance surface 10a and traveling directly to the end surface 12, emerge from the exit surface 10b at angles relative to the perpendicular to the exit surface 10b respectively equal to the incident angles. Therefore, the luminance in a direction perpendicular to the exit surface 10b is high when most incident light rays are perpendicular to the entrance surface 10a. Thus luminance in a direction substantially perpendicular to the exit surface 10a is a maximum and the light-diffusing sheet 10 has an ideal characteristic of making the viewer able to view images in the highest luminance from a direction perpendicular to the exit surface 10b.

As mentioned above, when the side surface 15 of the wedge-shaped part 14 is formed so as to reflect or refract incident light rays fallen perpendicularly on the entrance surface 10a several times, incident light rays fallen perpendicularly on the entrance surface 10a emerge from the exit surface 10b at large diffusion angles while incident light rays obliquely fallen on the entrance surface 10a are condensed by the side surface 15 of the wedge-shaped part 14 in a direction substantially perpendicular to the exit surface 10b. Therefore, the luminance in a direction perpendicular to the exit surface 10b is high and the incident light cannot be diffused in a wide angular range if most of the incident light rays are oblique to the entrance surface 10a. On the other hand, incident light rays, which fall on the flat end surface 16 of the wedge-shaped part 14 at large angles relative to the perpendicular to the flat end surface 16 through the entrance surface 10a, emerge from the exit surface 10b at large diffusion angles, while incident light rays, which fall on the flat end surface 16 of the wedge-shaped part 14 at small angles relative to the perpendicular to the flat end surface 16 through the entrance surface 10a, emerge from the exit surface 10b at diffusion angles equal to the incident angles thereof. Therefore, when certain quantity of incident light rays are oblique to the entrance surface 10a, which is a condition when the light-diffusing sheet 10 is used in combination with an LCD, the flat end surface 16 of the wedge-shaped part 14 can make the light rays emerge from the exit surface 10b at diffusion angles in a wide angular range and control luminance in a direction perpendicular to the exit surface 10b. The pitch P of the wedge-shaped parts 14 should be taken into consideration in determining the width W of the flat end surfaces 16 to prevent excessive increase of luminance in a direction perpendicular to the exit surface 10b by incident light rays perpendicular to the entrance surface 10a. In particular, reduction of the width W5 of the end surfaces 12 of the sheet body 11 is effective in preventing excessive increase of luminance in a direction perpendicular to the exit surface 10b.

Experiments were conducted using test light-diffusing sheet formed by changing ratios W/P (where W is the width of the flat end surface 16 of the wedge-shaped part 14 and P is the pitch of the wedge-shaped parts 14 of the test light-diffusing sheets) of the light-diffusing sheet 10 shown in the FIG. 1, in order to measure ½ diffusion angle (namely, an angle of a viewing direction, the luminance in which is ½ of the peak luminance, relative to the perpendicular to the exit surface 10b). Measured data is shown in Table 1. Light rays were made to fall on the entrance surface 10a at incident angles in the range of 0° to 30° so that luminance in a direction perpendicular to the entrance surface 10a may be the highest and luminance may gradually decrease with increase of angle of viewing direction relative to the perpendicular to the entrance surface 10a on an assumption of incident light ray emitted by LCD. The ½ diffusion angle of each test light-diffusing sheet for foregoing incident light rays was 15°.

TABLE 1

| | W/P | | | | | | |
|---|---|---|---|---|---|---|---|
| | 0 | 0.05 | 0.10 | 0.15 | 0.20 | 0.25 | 0.30 |
| ½ diffusion angle (°) | 18 | 20 | 28 | 30 | 25 | 20 | 18 |

As obvious from Table 1, the ½ diffusion angle increases when the wedge-shaped parts 14 are provided with the flat end surfaces 16, and the ½ diffusion angle decreases when the ratio W/P increases beyond a threshold. This is because even light ray L102 fallen at a large incident angle on the entrance surface 10a emerges from the exit surface 10b (outer end surface 17) in a direction at an angle equal to the incident angle to the perpendicular to the exit surface 10b without traveling into the sheet body 11 again as shown in FIG. 10 when the width W of the flat end surfaces 16 increases beyond a threshold. Resemblance of the distribution of intensity (luminance) of outgoing light rays emerging from the exit surface 10b to that of incident light rays becomes stronger as the width W of the flat end surfaces 16 increases.

It is understood from those facts that it is effective to adjust the relation between the sectional dimension (width) W of the flat end surfaces 16 of the wedge-shaped parts 14 and the pitch P of the wedge-shaped parts 14 in suppressing luminance in a direction perpendicular to the exit surface 10b and in diffusing incident light rays so that the incident light rays emerge from the exit surface 10b in directions at angles to the perpendicular to the exist surface 10b in a wide angular range, when the incident light rays include those inclined to some extend to the entrance surface 10a. It is preferable to adjust the width W in the range of 0.1 P to 0.2 P. It is understood from large ½ diffusion angles for such ratio W/P shown in Table 1 that the viewer is able to view sufficiently bright images from directions other than the direction perpendicular to the light-diffusing sheet 10.

A diffusing material, not shown, may be dispersed in the resin forming the wedge-shaped parts 14 when it is desired to suppress luminance in a direction substantially perpendicular to the exit surface 10b and to increase luminance in directions other than a direction perpendicular to the exit surface 10b. Diffusing material is substantially spherical particles of a resin, such as a styrene resin, having a refractive index different from that of the transparent resin forming the wedge-shaped parts 14. Light rays fallen on the wedge-shaped parts 14 are refracted or reflected by the diffusing material, and diffused in directions along the width and height of the light-diffusing sheet 10. Consequently, luminance in a direction substantially perpendicular to the exit surface 10b is reduced and luminance in directions other than a direction perpendicular to the exit surface 10b can be increased. In addition, it is possible to make the transition of the luminance of the outgoing light rays with diffusion angle be smoothly.

Figure 5:
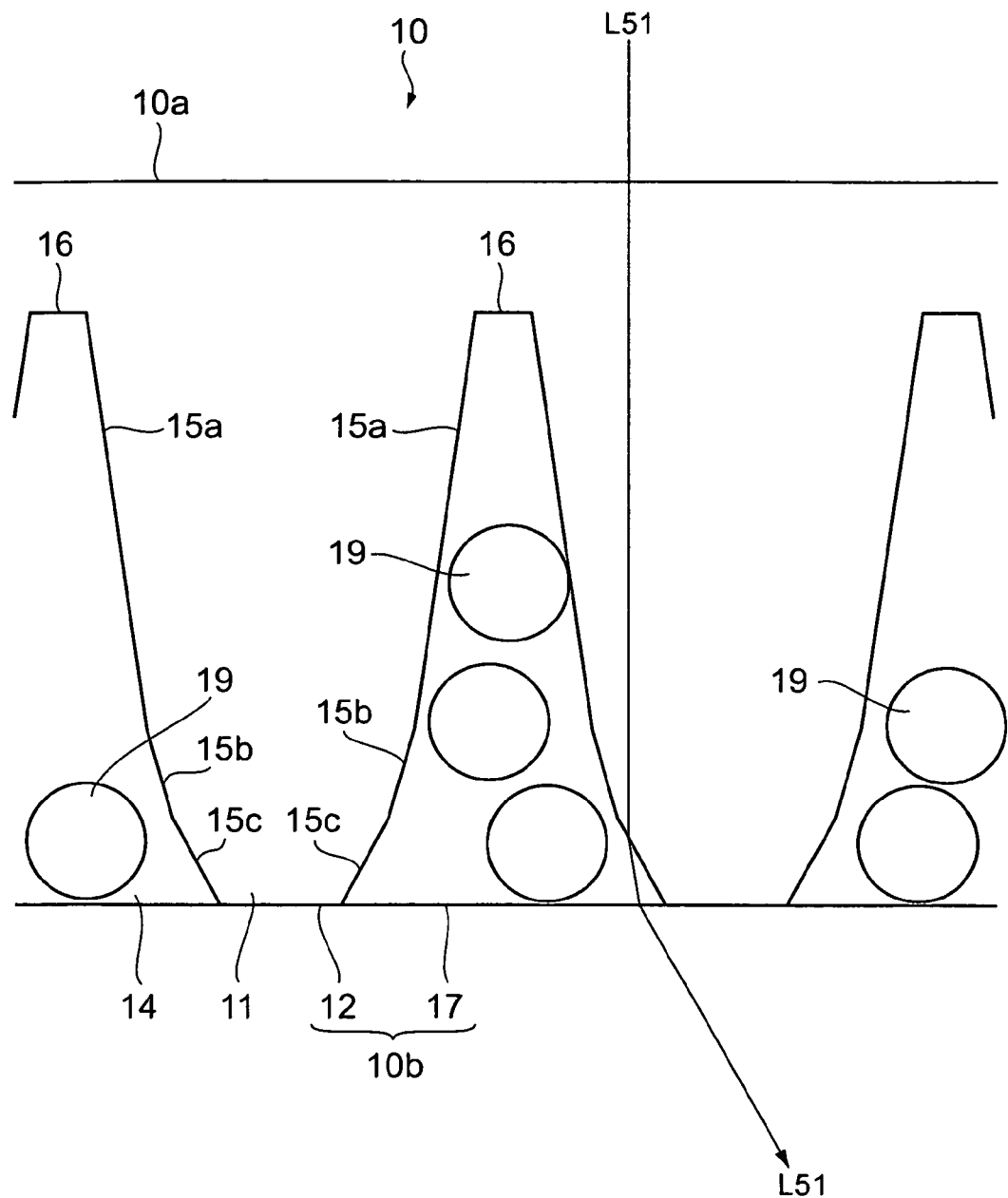
FIG. 5 is a diagrammatic view of wedge-shaped parts in which light-absorbing particles are dispersed.

When the light-diffusing sheet 10 is used in combination with a projection screen, it is effective to disperse light-absorbing particles 19 in the wedge-shaped parts 14 as shown in FIG. 5. The light-absorbing particles 19 are particles, such as large spherical particles, capable of absorbing light. The light-absorbing particles 19 may be formed of a black acrylic resin or the like. The light-absorbing particles 19 absorb external light that enters the light-diffusing sheet 10 through the exit surface 10b to increase the contrast of images for the viewer.

As mentioned above, light rays projected by a projector for the projection screen fall substantially perpendicularly on the entrance surface 10a of the light-diffusing sheet 10. Most of light rays fallen on the side surface 15 of the wedge-shaped part 14, such as light rays L82, L83 and L84 shown in FIG. 8, are reflected in total reflection on the side surface 15, while only a few light rays fallen on the side surface 15, such as a light ray L85, are refracted at the side surface 15 and enter the wedge-shaped part 14. In addition, the amount of light that travels into the wedge-shape part 14 can be reduced by narrowing the width W of the flat end surface 16. Thus the transmittance of the light-diffusing sheet 10 will not be significantly reduced due to the absorption of a large amount of light projected by the projector for the projection screen on the light-diffusing sheet 10 by the light-absorbing particles 19 dispersed in the wedge-shaped part 14.

As mentioned above, light rays which enter the wedge-shaped parts 14 among those perpendicularly fallen on the entrance surface 10a are only those which are refracted at the inclined surface (only the inclined surface 15c, in this embodiment) inclined at a large angle relative to the perpendicular to the entrance surface 10a, such as a light ray L85 shown in FIG. 8. As shown in FIG. 5, if the light-diffusing particles 19 having a large diameter are used, the light-absorbing particles 19 will not be dispersed in a region near the inclined surfaces positioned on the side of exit surface 10b. Consequently, the light ray L85 refracted at the side surface 15 of the wedge-shaped part 14 to travel into the wedge-shaped part 14 will not be absorbed and hence the reduction of the transmittance of the light-diffusing sheet 10 can be prevented.

As described above, according to this embodiment, it is possible to make incident light rays emerge from the exit surface 10b at diffusion angles in a wide angular range by adjusting the respective widths W2, W3 and W4 of the inclined surfaces 15a, 15b and 15c of the side surface 15 of the wedge-shaped part 14 embedded in the sheet body 11 and the respective angles θ1, θ2 and θ3 of inclination of the inclined surfaces 15a, 15b and 15c relative to the perpendicular to the entrance surface 10a, even if the respective refractive indices N1 and N2 of the sheet body 11 and the wedge-shaped parts 14 are not greatly different from each other. Moreover, it is possible to make the luminance change smoothly with the diffusion angle of outgoing light rays.

Light obliquely fallen on the entrance surface 10a can be diffused by providing the wedge-shaped parts 14 with the flat end surfaces 16 and adjusting the width W of the flat end surfaces 16 relative to the pitch P of the wedge-shaped parts 14.

Since the respective refractive indices N1 and N2 of the sheet body 11 and the wedge-shaped parts 14 do not need to be greatly different from each other, the light-diffusing sheet 10 is inexpensive.

Since the entrance surface 10a of the light-diffusing sheet 10 is flat, the light-diffusing efficiency of the light-diffusing sheet 10 will not be reduced even if the entrance surface 10a is bonded to the screen of an LCD or the like with an adhesive.

Figure 6:
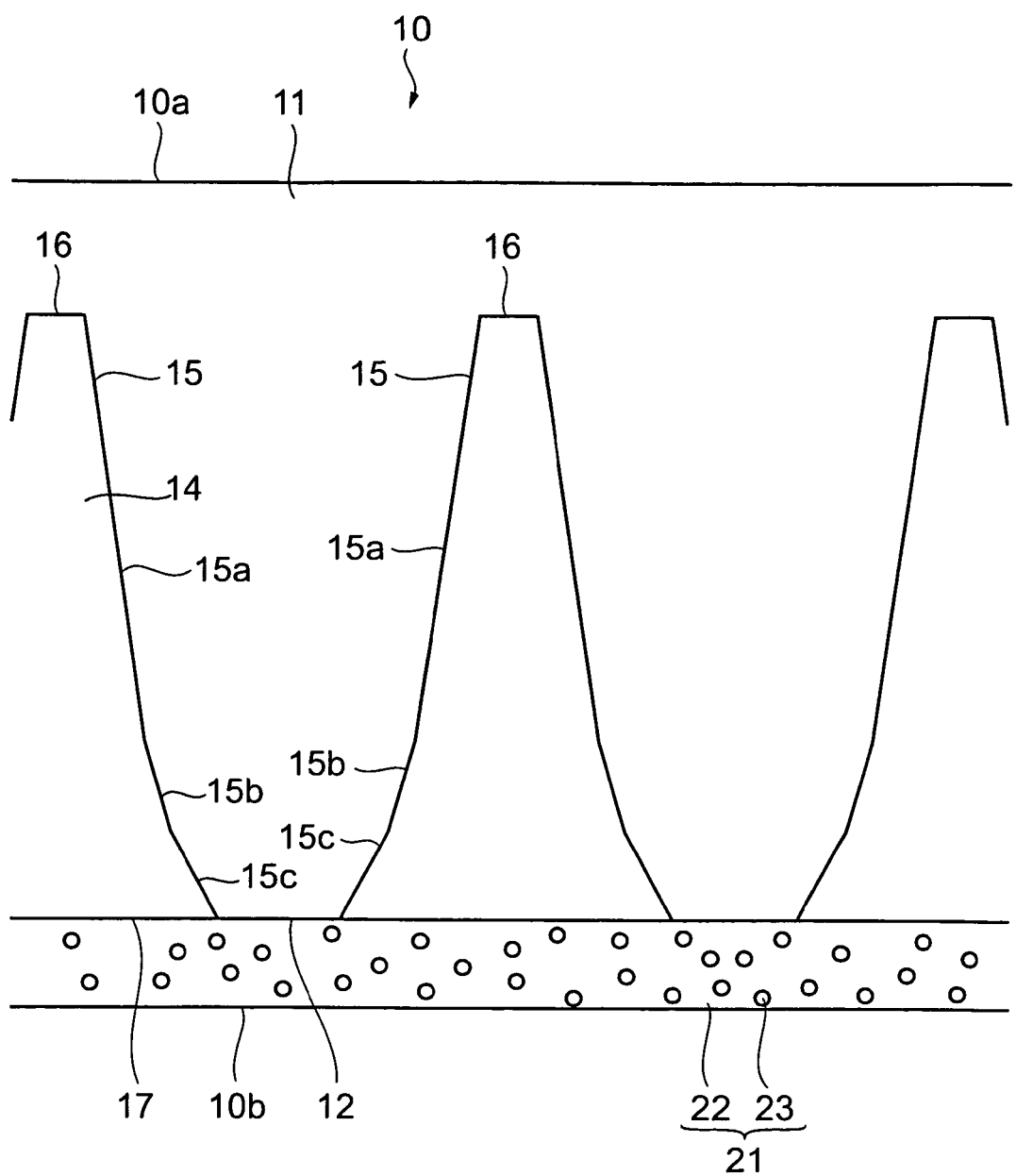
FIG. 6 is a diagrammatic view of a modification of the light-diffusing sheet.

Although the light-diffusing sheet in this embodiment includes the sheet body and the wedge-shaped parts, the construction of the light-diffusing sheet of the present invention is not limited to that specifically described herein. As shown in FIG. 6 the light-diffusing sheet may be additionally provided with an auxiliary diffusing layer 21 on the side of the exit surface 10b of the sheet body 11, in order to enhance the diffusing efficiency of the light-diffusing sheet 10. When the light-diffusing sheet is provided with the auxiliary diffusing sheet 21, the exit surface 10b of the light-diffusing sheet is formed of the exposed surface of the auxiliary diffusing layer 21. The auxiliary diffusing layer 21 may consist of a transparent resin layer 22 of a UV-curable acrylic resin or the like and auxiliary diffusing particles 23 dispersed in the resin layer 22. The auxiliary diffusing particles 23 are formed of a resin having a refractive index different from that of the resin forming the resin layer 22. The auxiliary diffusing particles 23 are, for example, substantially spherical particles of an acrylic resin, a styrene resin, a melamine resin, silica, silicone, or the like. When light rays enter the auxiliary diffusing layer 21, light rays are refracted or reflected by the auxiliary diffusing particles 23 and diffused in directions along the width and height of the light-diffusing sheet 10. The luminance of the outgoing light rays of the light-diffusing sheet 10 can be made to change smoothly with angle relative to the perpendicular to the exit surface 10b of the light-diffusing sheet 10.

Although the wedge-shaped parts 14 extending in a direction along the height of the light-diffusing sheet 10 are arranged at the fixed pitch in a direction along the width of the light-diffusing sheet 10 in this embodiment, the present invention is not limited thereto. The wedge-shaped parts 14 may be extended in a direction along the width of the light-diffusing sheet 10 at the fixed pitch in a direction along the height of the light-diffusing sheet 10, in order to diffuse light in the height direction of light-diffusing sheet 10 at large angles. Moreover, Wedge-shaped parts extending respectively in directions along the height and width of the light-diffusing sheet 10 may be arranged at the fixed pitch in directions along the width and height of the light-diffusing sheet 10, respectively, in the shape of a grid. Wedge-shaped parts substantially resembling a circular cone also may be arranged at a fixed pitch in directions along the width and height of the light-diffusing sheet. According to the most recent two modifications, it is possible to diffuse incident light at large angles in directions along the width and height of the light-diffusing sheet 10.

Figure 7:
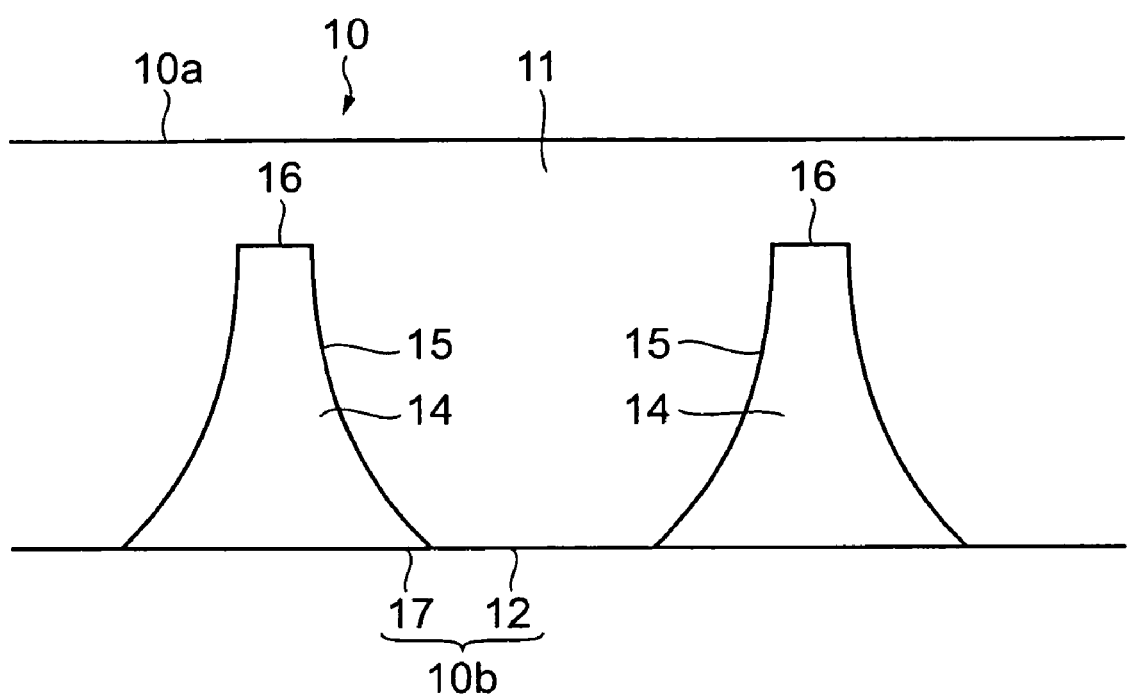
FIG. 7 is a diagrammatic view of a modification of the wedge-shaped part.

The component inclined surfaces of the side surface 15 of the wedge-shaped part 14 are not limited to the three inclined surfaces 15a, 15b and 15c, and the number of the inclined surfaces of the side surface 15 may be other than three. As shown in FIG. 7, the number of the inclined surfaces of the side surface 15 may be increased infinitely to form a substantially curved surface as the side surface 15.

EXAMPLE

An example of the light-diffusing sheet 10 will be described.

A light-diffusing sheet in an example was fabricated. The light-diffusing sheet permits incident light rays to travel along optical paths shown in FIGS. 8 to 10 and is capable of diffusing incident light in a wide angular range.

A sheet body 11 was formed of an epoxy acrylate resin having a refractive index N1 of 1.55, and wedge-shaped parts 14 were formed of a urethane acrylate resin having a refractive index N2 of 1.48. The ratio N2/N1 is about 0.95. The wedge-shaped parts 14 extend in the direction of the height of the light-diffusing sheet 10 and are arranged at a fixed pitch in the direction along the width of the light-diffusing sheet 10. Each wedge-shaped part 14 has side surfaces 15. Each of the side surfaces 15 consists of three inclined surfaces 15a, 15b and 15c. The inclined surfaces 15a, 15b and 15c are inclined to the perpendicular to the entrance surface 10a at angles θ1, θ2 and θ3, respectively. The angles θ1, θ2 and θ3 increase in that order toward the exit surface 10b.

The following are parameters (see FIG. 1) of dimensions and angles specifying the sheet body 11 and the wedge-shaped part 14.

P=23 μm, W=3 μm, W2=3 μm, W3=1.5 μm, W4=2 μm, W5=7 μm, θ1=8°, θ2=16°, θ3=25°

The angle θ3 between the inclined surface 15c nearest to the exit surface 10b and the perpendicular to the entrance surface 10a is larger than three times the angle θ1 between the inclined surface 15a nearest to the entrance surface 10a and the perpendicular to the entrance surface 10a, and W is approximately 0.13 P.

The light-diffusing sheet 10 is additionally provided with an auxiliary diffusing layer 21 on the side of the exit surface 10b of the sheet body 11. Resin layer 22 of the auxiliary diffusing layer 21 was formed of a UV-curable resin having a refractive index of 1.49. Substantially spherical particles of a styrene resin having a refractive index of 1.59 as auxiliary diffusing particles were dispersed in the resin layer 22 of the auxiliary diffusing layer 21. Diameters of the substantially spherical particles of the styrene resin were in the range of 3 to 7 μm.

Figure 11:
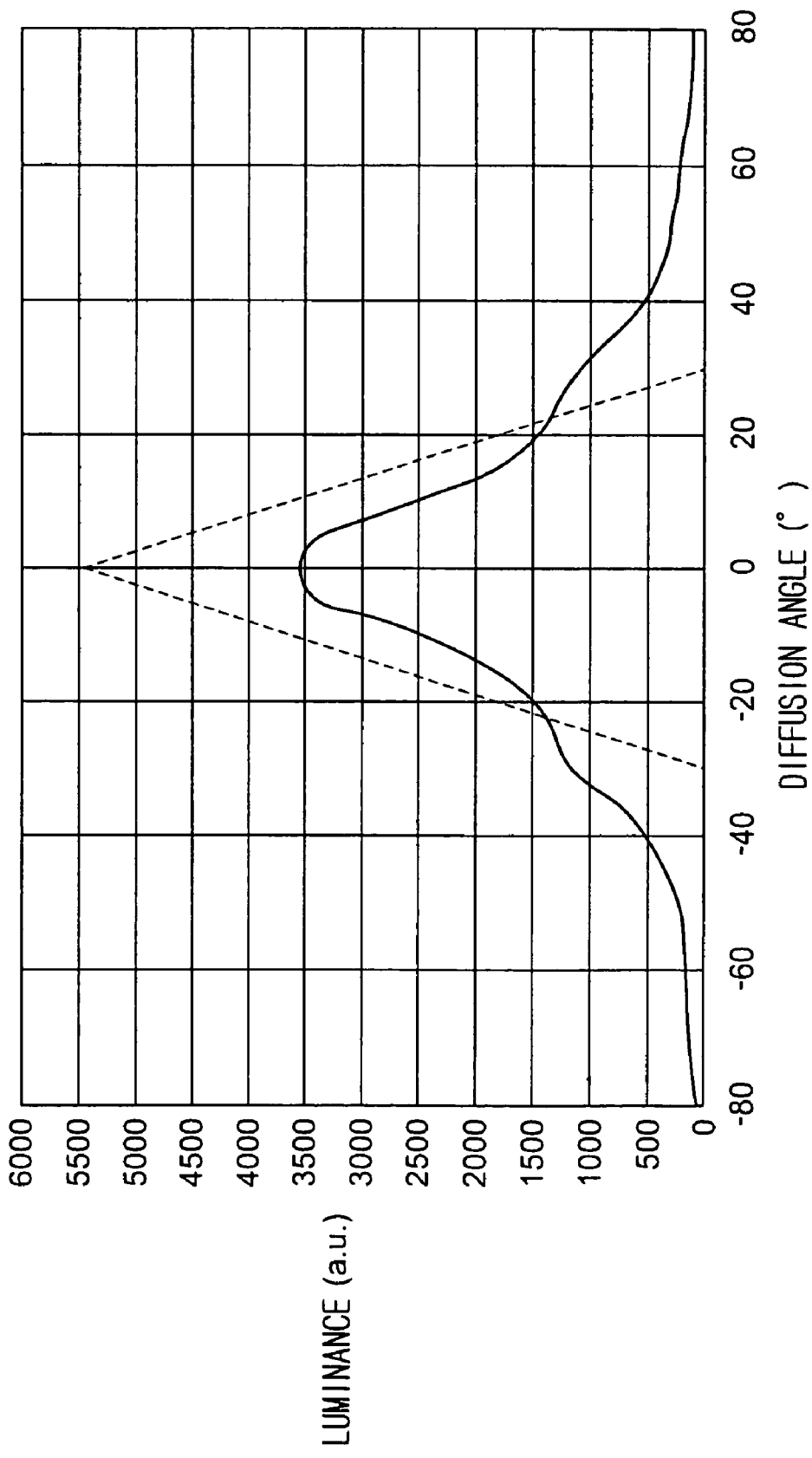
FIG. 11 is a graph showing luminance distribution on the exit surface as a function of angle between viewing direction and the perpendicular to the exit surface.

Light rays were projected on the light-diffusing sheet 10 thus constructed. FIG. 11 shows a luminance distribution on the exit surface 10b of the light-diffusing sheet 10 as a function of diffusion angle. Light rays were so projected as to fall on the entrance surface 10a at incident angles in the range of 0° to 30° as indicated by dotted lines in FIG. 11 so that luminance in a direction perpendicular to the entrance surface 10a may be the highest and luminance may gradually decrease with the increase of the angle between viewing direction and the perpendicular to the entrance surface 10a, on an assumption that the light-diffusing sheet 10 was used in combination with an LCD.

As obvious from FIG. 11, the luminance in a direction perpendicular to the entrance surface 10a was the highest and decreased smoothly with increase of the angle relative to the perpendicular to the entrance surface 10a.

As obvious from FIG. 8, light perpendicularly incident on the entrance surface fallen on the side surface 15 of the wedge-shaped part 14 is diffused in a wide angular range even if the light falls perpendicularly on the entrance surface 10a.

As obvious from FIGS. 9 and 10, light rays fallen at large incident angles on the entrance surface 10a have a tendency to be condensed in a direction substantially perpendicular to the entrance surface 10a.

The ratio of light rays reflected in total reflection by the exit surface 10b to all of the light rays incident on the entrance surface 10a was 2%. The ratio of light rays reflected in total reflection at least twice on the side surfaces of the wedge-shaped parts 14 to all of the incident light rays perpendicularly incident on the entrance surface 10a was not smaller than 1.5%.

The invention claimed is:

1. A light-diffusing sheet having a flat entrance surface and an exit surface parallel to the flat entrance surface, said light-diffusing sheet comprising:
   a sheet body; and
   a plurality of wedge-shaped parts, each being embedded on the side of the exit surface of the sheet body, having a section of a shape substantially resembling a wedge, expanding toward the exit surface, and being formed of a resin having a refractive index lower than that of a material of the sheet body;
   wherein each of the side surfaces of each of the wedge-shaped parts is formed of inclined surfaces constituting a polygonal surface, angles formed by the inclined surfaces of each side surface and the perpendicular to the entrance surface gradually become greater toward the exit surface; and an end of each of the wedge-shaped parts on the side of the entrance surface is a flat surface parallel to the entrance surface.

2. The light-diffusing sheet according to claim 1, wherein the angle formed by the inclined surface, nearest to the exit surface, of the side surface of the wedge-shaped part and the perpendicular to the entrance surface is not smaller than twice the angle formed by the inclined surface, nearest to the entrance surface, of the side surface of the wedge-shaped part and the perpendicular to the entrance surface.

3. The light-diffusing sheet according to claim 1, wherein each of the wedge-shaped parts of the light-diffusing sheet is adjusted such that the ratio of light rays reflected in total reflection by the exit surface to all of the light rays incident on the entrance surface at incident angles in the range of 0° to 30° is in the range of 0.1% to 3%.

4. The light-diffusing sheet according to claim 1, wherein the ratio of the refractive index of the wedge-shaped parts to that of the sheet body is in the range of 0.90 to 0.97.

5. The light-diffusing sheet according to claim 1, wherein each of the wedge-shaped parts of the light-diffusing sheet is adjusted such that the ratio of light rays reflected in total reflection at least twice on the side surfaces of the wedge-shaped parts to all of the light rays perpendicularly incident on the entrance surface is 1% or above.

6. The light-diffusing sheet according to claim 1 further comprising an auxiliary diffusing layer formed on the side of the exit surface of the sheet body.

7. The light-diffusing sheet according to claim 1, wherein the wedge-shaped parts are arranged at a fixed pitch P, and the flat end surfaces of the wedge-shaped parts have a width W in the range of 0.1 P to 0.2 P.

8. The light-diffusing sheet according to claim 1, wherein light-absorbing particles are dispersed in the wedge-shaped parts.

* * * * *